(12) United States Patent
Landa et al.

(10) Patent No.: US 7,488,538 B2
(45) Date of Patent: Feb. 10, 2009

(54) COATED ARTICLE INCLUDING SODA-LIME-SILICA GLASS SUBSTRATE WITH LITHIUM AND/OR POTASSIUM TO REDUCE SODIUM MIGRATION AND/OR IMPROVE SURFACE STABILITY AND METHOD OF MAKING SAME

(75) Inventors: Leonid M. Landa, Brownstown, MI (US); Ksenia A. Landa, Brownstown, MI (US); Anthony V. Longobardo, Oak Grove, MI (US); Vijayen S. Veerasamy, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 281 days.

(21) Appl. No.: 11/198,404

(22) Filed: Aug. 8, 2005

(65) Prior Publication Data

US 2007/0036987 A1   Feb. 15, 2007

(51) Int. Cl.
B32B 15/00   (2006.01)

(52) U.S. Cl. ......................... 428/432; 428/428; 428/434

(58) Field of Classification Search .................. 501/55, 501/68, 70, 72
See application file for complete search history.

(56) References Cited

U.S. PATENT DOCUMENTS

| | | | |
|---|---|---|---|
| 4,156,755 A | 5/1979 | Rinehart | |
| 4,859,636 A | 8/1989 | Aratani et al. | |
| 5,569,630 A | 10/1996 | Landa et al. | |
| 5,709,725 A | 1/1998 | Imashita | |
| 5,736,476 A | 4/1998 | Watzke et al. | |
| 5,811,921 A | 9/1998 | Ligthart et al. | |
| 5,849,649 A | 12/1998 | Poole | |
| 6,204,212 B1 | 3/2001 | Kunert et al. | |
| 6,235,666 B1 | 5/2001 | Cochran et al. | |
| 6,426,311 B1 | 7/2002 | Goto et al. | |
| 6,436,859 B1 | 8/2002 | Muramoto et al. | |
| 6,498,118 B1 | 12/2002 | Landa et al. | |
| 6,610,622 B1 | 8/2003 | Landa et al. | |
| 6,686,050 B2 | 2/2004 | Lingle et al. | |
| 6,713,178 B2 | 3/2004 | Veerasamy | |
| 6,716,780 B2 | 4/2004 | Landa et al. | |
| 6,723,211 B2 | 4/2004 | Lingle et al. | |
| 6,749,941 B2 | 6/2004 | Lingle | |
| 6,777,030 B2 | 8/2004 | Veerasamy et al. | |
| 6,782,718 B2 | 8/2004 | Lingle et al. | |
| 6,797,658 B2 | 9/2004 | Pecoraro et al. | |

(Continued)

FOREIGN PATENT DOCUMENTS

EP   0 146 187   6/1985

(Continued)

*Primary Examiner*—Timothy M Speer
(74) *Attorney, Agent, or Firm*—Nixon & Vanderhye P.C.

(57) ABSTRACT

A coated article includes a glass substrate that supports a coating such as a low-E (low emissivity) coating. In certain example embodiments, the glass substrate is formed of a soda-lime-silica based glass composition manufactured using a float process. In certain example embodiments, lithium oxide (e.g., $LiO_2$) and/or potassium oxide ($K_2O$) is used in the soda-lime-silica based glass substrate in order to reduce sodium migration and/or improve surface stability. Such coated articles are useful, for example and without limitation, in architectural, vehicular and/or residential glass window applications.

20 Claims, 2 Drawing Sheets

| U.S. PATENT DOCUMENTS | | | | | |
|---|---|---|---|---|---|
| 6,844,280 B2 * | 1/2005 | Koyama et al. ............... 501/70 | EP | 1 270 524 | 1/2003 |
| 6,878,652 B2 | 4/2005 | Pecoraro et al. | JP | 09-167568 | 6/1997 |
| 6,887,575 B2 | 5/2005 | Neuman et al. | WO | WO 00/37382 | 6/2000 |
| 6,916,408 B2 | 7/2005 | Laird et al. | | | |

FOREIGN PATENT DOCUMENTS

| EP | 1 195 359 | 4/2002 |
|---|---|---|

* cited by examiner

COATED ARTICLE INCLUDING SODA-LIME-SILICA GLASS SUBSTRATE WITH LITHIUM AND/OR POTASSIUM TO REDUCE SODIUM MIGRATION AND/OR IMPROVE SURFACE STABILITY AND METHOD OF MAKING SAME

This invention relates to a coated article including a glass substrate that supports a coating such as a low-E (low emissivity) coating. In certain example embodiments, the glass substrate is formed of a soda-lime-silica based glass composition manufactured on a float line. In certain example embodiments, lithium (e.g., $LiO_2$) and/or potassium ($K_2O$) is used in the soda-lime-silica based glass substrate in order to reduce sodium migration and/or improve surface stability. Such coated articles are useful, for example and without limitation, in architectural, vehicular and/or residential glass window applications.

BACKGROUND OF THE INVENTION

Coated articles including low-E coatings supported by glass substrates are known in the art. For example, see U.S. Pat. Nos. 6,723,211, 6,686,050, 6,749,941, 6,916,408, and 6,887,575, the disclosures of which are all hereby incorporated herein by reference. Each of these patents discloses a low-E coating supported by a glass substrate. The glass substrate is often a soda-lime-silica type of glass substrate including at least $SiO_2$, CaO and $Na_2O$.

Such coated articles often need to be heat treated. Examples of heat treatment (HT) include thermal tempering, heat bending (e.g., in vehicle windshield applications) and heat strengthening. For instance, in certain applications tempering is required by code (e.g., e.g., for building windows over doorways, for windows identified as breakable windows for firemen, and other applications). Heat treatment (e.g., tempering, heat bending, etc.) typically involves heating the glass substrate with a coating thereon in a furnace at a temperature of at least about 580 degrees C., more preferably at least about 600 degrees C., and often at least about 620 or 640 degrees C. (e.g., for at least about 2 minutes, more preferably for at least about 5 minutes). Thus, it will be appreciated that such heat treatments typically involve very high temperatures.

Unfortunately, due to the high temperatures involved, heat treatment such as tempering and/or heat bending can cause damage to low-E coatings supported by the glass substrate. For example, the high temperatures used in such heat treatments often cause sodium (Na) to migrate from the glass into the coating. If sodium reaches the coating (e.g., the IR reflecting layer(s) that is typically formed of or based on Ag), the coating may be damaged. For example, sodium migration from the glass substrate into the coating can cause the coated article to have undesirable haze, undesirable color, and/or reduced visible transmission following heat treatment.

Thus, it will be appreciated that there exists a need in the art to provide a coated article which is resistant to sodium migration during optional heat treatment.

SUMMARY OF EXAMPLE EMBODIMENTS OF THE INVENTION

This invention relates to a coated article including a glass substrate that supports a coating such as a low-E (low emissivity) coating. In certain example embodiments, the glass substrate is formed of a soda-lime-silica based glass composition manufactured on a float line. In certain example embodiments, lithium (e.g., $LiO_2$) and/or potassium ($K_2O$) is used in the soda-lime-silica based glass substrate in order to reduce sodium migration and/or improve surface stability. Such coated articles are useful, for example and without limitation, in architectural, vehicular and/or residential glass window applications.

Soda-lime-silica float glass includes at least $SiO_2$, CaO and $Na_2O$. Colorants may also be present. In certain example embodiments of this invention, a small part of the sodium ($Na_2O$) is replaced with lithium (e.g., $LiO_2$) and/or potassium ($K_2O$). Surprisingly, it has been found that this decreases the mobility of alkali ions in the glass, thereby decreasing undesirable sodium migration during optional heat treatment which in turn better protect any low-E coating which may be supported by the glass substrate. It has also unexpectedly been found that this improves the durability of the glass with respect to water and reduces the melting and refining time of the glass.

In certain example embodiments of this invention, from about 0.1 to 6% (more preferably from about 0.5 to 5%, even more preferably from about 1 to 3%) of the sodium ($Na_2O$) is replaced with lithium (e.g., $LiO_2$) and/or potassium ($K_2O$). Thus, in certain example embodiments of this invention, the glass substrate (which may support a low-E coating in certain example embodiments of this invention) includes from about 0.1 to 6% (more preferably from about 0.5 to 5%, even more preferably from about 1 to 3%) lithium oxide (e.g., $LiO_2$) and/or potassium oxide ($K_2O$), in addition to the soda-lime-silica and optional colorant ingredients.

In certain example embodiments, there is provided a coated article comprising: a glass substrate; a low-E coating supported by the glass substrate, the low-E coating including at least one infrared (IR) reflecting layer comprising silver sandwiched between at least first and second dielectric layers; wherein the glass substrate is comprised of a glass composition comprising: $SiO_2$ 67-75%, $Na_2O$ 6-20%, CaO 5-15%, $Al_2O_3$ 0-7%, $K_2O$ 0-7%, and wherein the glass composition of the glass substrate further comprises from about 0.1 to 6.0% lithium oxide in order to reduce mobility of alkali ions in the glass substrate and thus reduce sodium migration. The glass substrate may be heat treated in certain example instances.

In other example embodiments of this invention, there is provided a heat treated coated article comprising: a heat treated glass substrate; a low-E coating supported by the glass substrate, the low-E coating including at least one infrared (IR) reflecting layer comprising silver; wherein the glass substrate is comprised of a glass composition comprising: $SiO_2$ 67-75%, $Na_2O$ 6-20%, CaO 5-15%, $Al_2O_3$ 0-7%, and $K_2O$ 0-7%, and wherein the glass composition of the heat treated glass substrate further comprises from about 0.1 to 6.0% lithium oxide.

In still further example embodiments of this invention, there is provided a coated article comprising: a glass substrate; a low-E coating supported by the glass substrate, the low-E coating including at least one infrared (IR) reflecting layer; wherein the glass substrate is comprised of a glass composition comprising: $SiO_2$ 67-75%, $Na_2O$ 6-20%, CaO 5-15%, $Al_2O_3$, 0-7%, and wherein the glass composition of the glass substrate further comprises from about 0.1 to 6.0% lithium oxide and/or potassium oxide in order to reduce mobility of alkali ions in the glass substrate.

In still further example embodiments of this invention, there is provided a heat treated (e.g., thermally tempered and/or heat bent) glass comprising: $SiO_2$ 67-75%, $Na_2O$ 6-20%, CaO 5-15%, $Al_2O_3$ 0-7%, and $K_2O$ 0-7%, and wherein the heat treated glass further comprises from about 0.1 to 6.0% lithium oxide in order to reduce mobility of alkali ions in the glass substrate and thus reduce sodium migration. Optionally, any suitable coating such as a low-E coating may be provided on the glass in certain example embodiments of this invention.

In other example embodiments of this invention, there is provided a method of making soda-lime-silica based glass, the method comprising: providing a glass formulation comprising: $SiO_2$ 67-75%, $Na_2O$ 6-20%, CaO 5-15%, $Al_2O_3$ 0-7%, and reducing the amount of $Na_2O$ in the glass composition and replacing it with from about 0.1 to 6.0% lithium oxide and/or potassium oxide.

DETAILED DESCRIPTION OF CERTAIN EXAMPLE EMBODIMENTS OF THIS INVENTION

Figure 1:
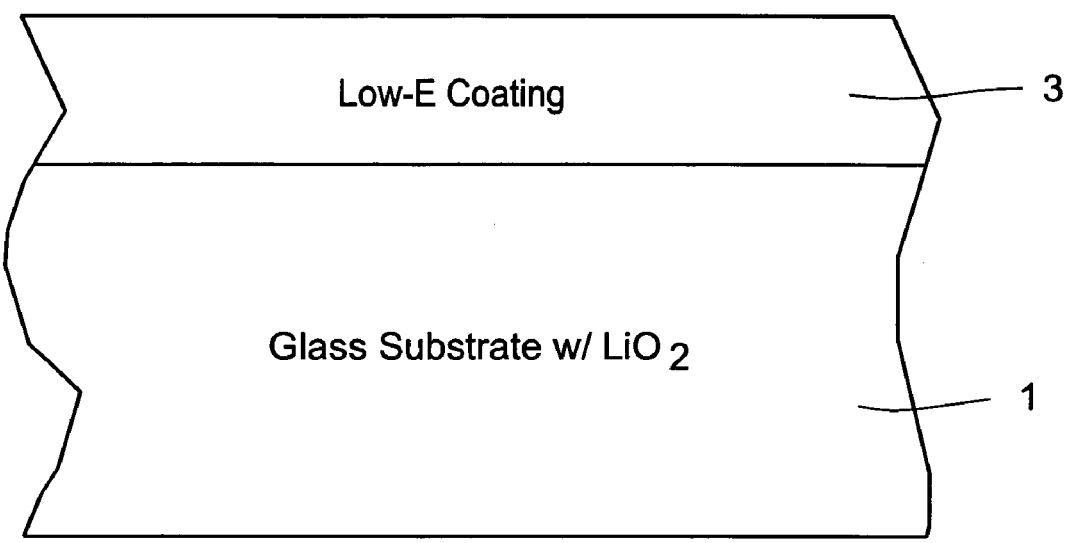
FIG. 1 is a cross sectional view of a coated article according to an example embodiment of this invention.

Referring now more particularly to the accompanying drawings in which like reference numerals indicate like parts throughout the several views.

Coated articles according to certain example embodiments of this invention include a glass substrate that supports at least a coating such as a low-E (low emissivity) coating. Such coated articles are useful, for example and without limitation, in architectural, vehicular and/or residential glass window applications.

Figure 2:
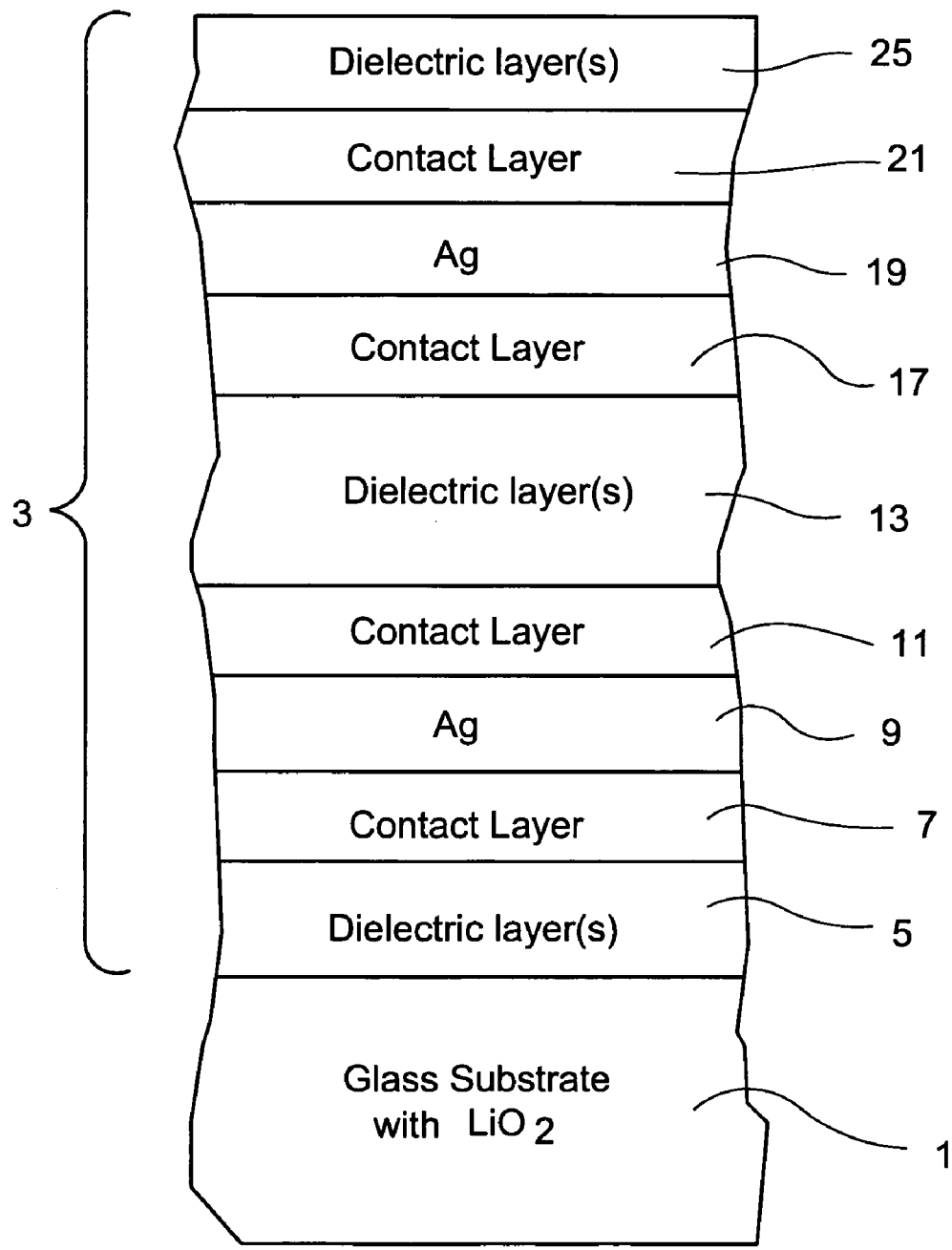
FIG. 2 is a cross sectional view of a coated article according to an example embodiment of this invention, illustrating an example low-E coating in more detail than in FIG. 1.

FIG. 1 is a cross sectional view of a coated article according to an example embodiment of this invention. The coated article includes soda-lime-silica based glass substrate 1 that supports at least low-E coating 3. FIG. 2 is a cross sectional view of a coated article according to an example embodiment of this invention, illustrated more details of an example non-limiting low-E coating 3 on the glass substrate 1. Example low-E coatings 3 that may be used on glass substrates 1 are described and/or illustrated in any of U.S. Pat. Nos. 6,723,211, 6,686,050, 6,749,941, 6,916,408, and 6,887,575, the disclosures of which are all hereby incorporated herein by reference. Of course, other types of low-E coatings may also be used according to alternative embodiments of this invention. A low-E coating 3 typically includes at least one infrared (IR) reflecting layer (e.g., of or including silver) sandwiched between at least a pair of dielectric layers. The IR reflecting layer functions to reflect IR radiation, whereas the dielectric layers are provided for antireflection and/or protective purposes.

Soda-lime-silica float glass in substrate 1 includes at least $SiO_2$, CaO and $Na_2O$. Colorant(s) such as iron, erbium, etc. may also be present in the glass. In certain example embodiments of this invention, a small part of the sodium ($Na_2O$) is replaced with lithium (e.g., $LiO_2$) and/or potassium ($K_2O$). Surprisingly, it has been found that the provision of lithium oxide (e.g., $LiO_2$) and/or potassium oxide ($K_2O$) in the glass of glass substrate 1 decreases the mobility of alkali ions in the glass, thereby decreasing undesirable sodium migration during optional heat treatment which in turn better protect any low-E coating 3 which may be supported by the glass substrate. It has also unexpectedly been found that this improves the durability of the glass 1 with respect to water and reduces the melting and refining time of the glass. Examples amounts of lithium and/or potassium oxide in the glass batch and/or final product are set forth below.

In certain example embodiments of this invention, from about 0.1 to 6% (more preferably from about 0.5 to 5%, even more preferably from about 1 to 3%) of the sodium ($Na_2O$) is replaced with lithium oxide (e.g., $LiO_2$) and/or potassium oxide ($K_2O$). Thus, in certain example embodiments of this invention, the glass substrate (which may support a low-E coating in certain example embodiments of this invention) includes from about 0.1 to 6% (more preferably from about 0.5 to 5%, even more preferably from about 1 to 3%) lithium oxide (e.g., $LiO_2$) and/or potassium oxide ($K_2O$), in addition to the soda-lime-silica and optional colorant ingredients. In certain example embodiments of this invention, the lithium oxide may be added to the glass batch during the float glass manufacturing process as carbonate, $Li_2CO_3$, and/or spodumene, $LiAl[Si_2O_6]$. When potassium is used, it may be added to the glass batching during the float glass manufacturing process as carbonate, $K_2CO_3$, and/or nitrate, $KNO_3$.

This patent refers to various oxides such as lithium oxide and potassium oxide (as well as other oxides). However, the use of these terms does not mean that the stoichiometries of these materials are limited to amounts $LiO_2$ and $K_2O$ of these elements (this applies to the other oxides as well). Instead, these terms are meant to include herein any suitable stoichiometry of these materials unless indicated to the contrary.

An example soda-lime-silica base glass according to certain embodiments of this invention, on a weight percentage basis, includes the following basic ingredients:

TABLE 1

| | Example Base Glass (Wt. %) | | |
|---|---|---|---|
| Ingredient | Range | More Preferred | Most Preferred |
| $SiO_2$ | 67-75% | 68-74% | 69-72% |
| $Na_2O$ | 6-20% | 8-15% | 9-13% |
| CaO | 5-15% | 6-12% | 7-11% |
| MgO | 0-7% | 0-6% | 1-5% |
| $Al_2O_3$ | 0-7% | 0-2% | 0.1-0.5% |

Additionally, one or both of the following is/are provided in the base glass composition (by weight %) to reduce sodium migration in the glass 1 and/or improve durability:

| $Li_2O$ | 0.1-6.0% | 0.5-5.0% | 1-3% |
|---|---|---|---|
| $K_2O$ | 0.1-6.0% | 0.5-5.0% | 1-3% |

Other minor ingredients, including various refining aids, such as salt cake, crystalline water and/or the like may also be included in the base glass. In certain embodiments, for example, glass herein may be made from batch raw materials silica sand, soda ash, dolomite, limestone, with the use of salt cake ($SO_3$) as a refining agent. Reducing agent(s) such as Si (metallic) (Si), silicon monoxide (SiO), sucrose, and/or carbon may also be used. Epsom may be used as a refining agent, for example, and may also be a way in which to get small amounts of MgO into the glass (e.g., $MgSO_4 \times 7H_2O$) (an example amount of MgO introduced via Epsom may be up to from 0.2 to 0.3%). While a soda-lime-silica base glass set forth above is preferred in certain embodiments of this invention, this invention is not so limited.

It is noted that no, or substantially no, MgO is possible in certain example embodiments of this invention.

In addition to the base glass materials discussed above (which includes the alkali earth oxides listed above), the glass batch and/or final glass may include a colorant portion including material(s) such as one or more of iron, erbium, cobalt, selenium and/or the like. In certain example embodiments of this invention, the amount of total iron in the glass may be from about 0.05 to 1.5%, more preferably from about 0.2 to 1.2%, and even more preferably from about 0.3 to 0.8%. The total amount of iron present in the glass, and thus in the colorant portion thereof, is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass (i.e., glass redox), which is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. Iron in the ferrous state ($Fe^{2+}$; FeO) is a blue-green colorant, while iron in the ferric state ($Fe^{3+}$) is a yellow-green colorant. According to certain embodiments of this invention, the colorant portion of the glass composition herein is characterized by a glass redox value (i.e., $FeO/Fe_2O_3$) of from about 0.15 to 0.35.

In certain example embodiments herein, glasses may be characterized by one or more of the optical characteristics set forth below when measured at a nominal thickness of from 1-6 mm, more preferably from about 3-4 mm (about 3 or 4 mm may be used for a reference thickness in certain example non-limiting embodiments, or about 0.219 inch thickness of glass may be used). The color values are transmissive, in accordance with the known x/y CIE color diagram.

TABLE 2

Example Optical Characteristics

| Characteristic | Preferred | More Preferred | Most Preferred |
|---|---|---|---|
| Lta (visible transmittance): | 8-90% | 60-90% | 70-85% |
| Dominant Wavelength (λ): | 400-600 nm | n/a | n/a |

FIG. 2 is a cross sectional view of a coated article according to an example embodiment of this invention. FIG. 2 differs from FIG. 1 in that more details are illustrated with respect to an example low-E coating that may be used according to an example embodiment of this invention. This particular low-E coating is provided for purposes of example only.

Referring to FIG. 2, the low-E coating 3 includes first dielectric anti-reflection layer(s) 5, first lower contact layer 7 (which contacts layer 9), first conductive metallic or substantially metallic infrared (IR) reflecting layer 9, first upper contact layer 11 (which contacts layer 9), second dielectric layer 13 (which may be deposited in one or multiple steps in different embodiments of this invention), second lower contact layer 17 (which contacts layer 19), second conductive metallic or substantially metallic IR reflecting layer 19, second upper contact layer 21 (which contacts layer 19), and upper dielectric layer(s) 25. The "contact" layers 7, 11, 17 and 21 each contact at least one IR reflecting layer (e.g., Ag layer).

In certain example embodiments of this invention, first dielectric layer 5 may be of or include titanium oxide (e.g., $TiO_x$ where x is from 1.7 to 2.3, most preferably x is about 2.0). However, in other embodiments, layer 5 may be of or include silicon nitride ($Si_xN_y$, where x/y may be about 0.75 (i.e., $Si_3N_4$), or alternatively x/y may be from about 0.76 to 1.5 in Si-rich embodiments), aluminum oxide, tin oxide, zinc oxide, $BiO_x$, SiZrN, or any other suitable dielectric material. Preferably, first dielectric layer 5 has an index of refraction "n" of at least 1.7, and preferably from about 2.0 to 2.7, and most preferably from 2.2 to 2.6. First dielectric layer 5 functions as an antireflection layer in certain embodiments of this invention.

Infrared (IR) reflecting layers 9 and 19 are preferably metallic or substantially metallic, and may be made of or include silver (Ag), gold, or any other suitable IR reflecting material. However, metallic Ag is the material of choice for the IR reflecting layers 9 and 19 in certain example non-limiting embodiments of this invention. These IR reflecting layers help to allow the coating 3 to have low-E characteristics. Due to the provision of the lithium oxide for example, the IR reflecting layers 9 and 19 are free of, or substantially free of, sodium from the glass following heat treatment in certain example embodiments of this invention.

The upper contact layers 11 and 21 (i.e., "upper" means the contact layers on top of the respective IR reflective layers 9, 19) are of or include nickel (Ni) oxide, chromium/chrome (Cr) oxide, or a nickel alloy oxide such as nickel chrome oxide ($NiCrO_x$), in certain example embodiments of this invention. The use of, for example, $NiCrO_x$ for/in these layers may permit durability to be improved, compared to the use of certain other materials. $NiCrO_x$ layers 11 and/or 21 may be fully oxidized in certain embodiments of this invention (i.e., fully stoichiometric), or may be at least about 50% oxidized in other embodiments of this invention. While $NiCrO_x$ is an example material for upper contact layers 11 and 21, those skilled in the art will recognize that other materials may instead be used (e.g., oxides of Ni, oxides of Ni alloys, oxides of Cr, oxides of Cr alloys, $NiCrO_xN_y$, or other suitable materials) for one or more of these layers in alternative embodiments of this invention. It is noted that upper contact layers 11 and/or 21 may or may not be continuous in different embodiments of this invention, depending upon their respective thickness(es). When upper contact layers 11 and/or 21 comprise $NiCrO_x$ in certain embodiments, the Ni and Cr may be provided in different amounts, such as in the form of nichrome by weight about 80-90% Ni and 10-20% Cr. Upper contact layer(s) 11 and/or 21 (e.g., of or including $NiCrO_x$) may or may not be oxidation graded in different embodiments of this invention (e.g., more oxided further from the silver).

The lower contact layers 7 and 17 ("lower" means the contact layers on the underneath side of the IR reflecting layers 9, 19) are of or include zinc oxide (e.g., $ZnO_x$, where x if from 0.6 to 1.2 in different example embodiments, more preferably x is from 0.7 to 1.0) in example non-limiting embodiments of this invention. For example, lower contact layer(s) 7 and/or 11 may consist essentially of zinc oxide in certain embodiments of this invention, while in other embodiments of this invention lower contact layer(s) 7 and/or 11 may include or consist essentially of $ZnAlO_x$, where x is set to a value such that the % Al (by weight) in the layer is from about 0-15%, more preferably from about 0-6%, and most preferably from about 1-4%.

Dielectric layer 13 acts as a coupling layer between the two halves of the low-E coating 3, and is of or includes tin oxide (e.g., $SnO_2$ or some non-stoichiometric form thereof) in certain embodiments of this invention. However, other dielectric materials may instead be used for layer 13, including but not limited to silicon nitride, titanium dioxide, niobium oxide, silicon oxynitride, zinc oxide, or the like. Dielectric layer(s) 25 permits the environmental resistance of the coating to be improved, and may also be provided for color purposes. In certain example embodiments, dielectric layer(s) 25 may include a first bottom layer of or including tin oxide and a second or overcoat layer of or including silicon nitride (e.g., $Si_3N_4$), although other materials may instead be used.

Other layer(s) below or above the illustrated coating 3 may also be provided. Thus, while the layer system or coating 3 is "on" or "supported by" substrate 1 (directly or indirectly), other layer(s) may be provided therebetween. Thus, for example, coating 3 of FIGS. 1 and/or 2 may be considered "on" and "supported by" the substrate 1 even if other layer(s) are provided between layer 5 (or coating 3) and substrate 1. Moreover, certain layers of coating 3 may be removed in certain embodiments, while others may be added in other embodiments of this invention without departing from the overall spirit of certain embodiments of this invention.

Once given the above disclosure many other features, modifications and improvements will become apparent to the skilled artisan. Such features, modifications and improvements are therefore considered to be a part of this invention, the scope of which is to be determined by the following claims:

What is claimed is:

1. A coated article comprising:

a glass substrate;

a low-E coating supported by the glass substrate, the low-E coating including at least one infrared (IR) reflecting layer comprising silver sandwiched between at least first and second dielectric layers;

wherein the glass substrate is comprised of a glass composition comprising:

| Ingredient | wt. % |
|---|---|
| $SiO_2$ | 67-75% |
| $Na_2O$ | 6-20% |
| CaO | 5-15% |
| $Al_2O_3$ | 0-7% |
| $K_2O$ | 0-7% | wherein the glass composition of the glass substrate further comprises from about 0.1 to 6.0% lithium oxide in order to reduce mobility of alkali ions in the glass substrate and thus reduce sodium migration.

2. The coated article of claim 1, wherein the glass composition of the glass substrate comprises from about 0.5 to 5.0% lithium oxide.

3. The coated article of claim 1, wherein the glass composition of the glass substrate comprises from about 1 to 3% lithium oxide.

4. The coated article of claim 1, wherein the glass substrate is comprised of a glass composition comprising:

| Ingredient | wt. % |
|---|---|
| $SiO_2$ | 68-74% |
| $Na_2O$ | 8-15% |
| CaO | 6-12% |
| $Al_2O_3$ | 0-2% |
| $K_2O$ | 0-6%. |

5. The coated article of claim 1, wherein the glass substrate is comprised of a glass composition comprising:

| Ingredient | wt. % |
|---|---|
| $SiO_2$ | 69-72% |
| $Na_2O$ | 9-13% |
| CaO | 7-11% |
| $Al_2O_3$ | 0.1-0.5%. |

6. The coated article of claim 1, wherein the low-E coating comprises first and second IR reflecting layers comprising silver, at least a first dielectric layer between the glass substrate and the first IR reflecting layer, at least a second dielectric layer between the first and second IR reflecting layers, and at least a third dielectric layer over at least the first and second IR reflecting layers.

7. The coated article of claim 6, wherein the low-E coating further comprises first and second lower contact layers comprising zinc oxide that are provided under and directly contacting each of the first and second IR reflecting layers, respectively.

8. The coated article of claim 1, wherein the glass substrate is heat treated so as to be thermally tempered and/or heat bent.

9. The coated article of claim 1, wherein the glass substrate is heat treated and following heat treatment the IR reflecting layer is substantially free of sodium.

10. A coated article comprising:

a glass substrate;

a low-E coating supported by the glass substrate, the low-E coating including at least one infrared (IR) reflecting layer;

wherein the glass substrate is comprised of a glass composition comprising:

| Ingredient | wt. % |
|---|---|
| $SiO_2$ | 67-75% |
| $Na_2O$ | 6-20% |
| CaO | 5-15% |
| $Al_2O_3$ | 0-7% | wherein the glass composition of the glass substrate further comprises from about 0.1 to 6.0% lithium oxide in order to reduce mobility of alkali ions in the glass substrate.

11. The coated article of claim 10, wherein the glass composition of the glass substrate comprises from about 1 to 3% lithium oxide.

12. The coated article of claim 10, wherein the glass substrate is comprised of a glass composition comprising:

| Ingredient | wt. % |
|---|---|
| $SiO_2$ | 68-74% |
| $Na_2O$ | 8-15% |
| CaO | 6-12% |
| $Al_2O_3$ | 0-2%. |

13. The coated article of claim 10, wherein the glass substrate is comprised of a glass composition comprising:

| Ingredient | wt. % |
| --- | --- |
| SiO$_2$ | 69-72% |
| Na$_2$O | 9-13% |
| CaO | 7-11% |
| Al$_2$O$_3$ | 0.1-0.5%. |

14. The coated article of claim 10, wherein the low-E coating comprises first and second IR reflecting layers comprising silver, at least a first dielectric layer between the glass substrate and the first IR reflecting layer, at least a second dielectric layer between the first and second IR reflecting layers, and at least a third dielectric layer over at least the first and second IR reflecting layers.

15. The coated article of claim 14, wherein the low-E coating further comprises first and second lower contact layers comprising zinc oxide that are provided under and directly contacting each of the first and second IR reflecting layers, respectively.

16. The coated article of claim 10, wherein the glass substrate is heat treated so as to be thermally tempered and/or heat bent.

17. The coated article of claim 10, wherein the glass substrate is heat treated and following heat treatment the IR reflecting layer is substantially free of sodium.

18. A heat treated coated article comprising:
a heat treated glass substrate;
a low-E coating supported by the glass substrate, the low-E coating including at least one infrared (IR) reflecting layer comprising silver;
wherein the glass substrate is comprised of a glass composition comprising:

| Ingredient | wt. % |
| --- | --- |
| SiO$_2$ | 67-75% |
| Na$_2$O | 6-20% |
| CaO | 5-15% |
| Al$_2$O$_3$ | 0-7% |
| K$_2$O | 0-7% | wherein the glass composition of the heat treated glass substrate further comprises from about 0.1 to 6.0% lithium oxide.

19. The coated article of claim 18, wherein the IR reflecting layer is free or substantially free of sodium.

20. Heat treated glass comprising:

| Ingredient | wt. % |
| --- | --- |
| SiO$_2$ | 67-75% |
| Na$_2$O | 6-20% |
| CaO | 5-15% |
| Al$_2$O$_3$ | 0-7% |
| K$_2$O | 0-7% | wherein the heat treated glass further comprises from about 0.1 to 6.0% lithium oxide in order to reduce mobility of alkali ions in the glass substrate and thus reduce sodium migration.

* * * * *